UNITED STATES PATENT OFFICE.

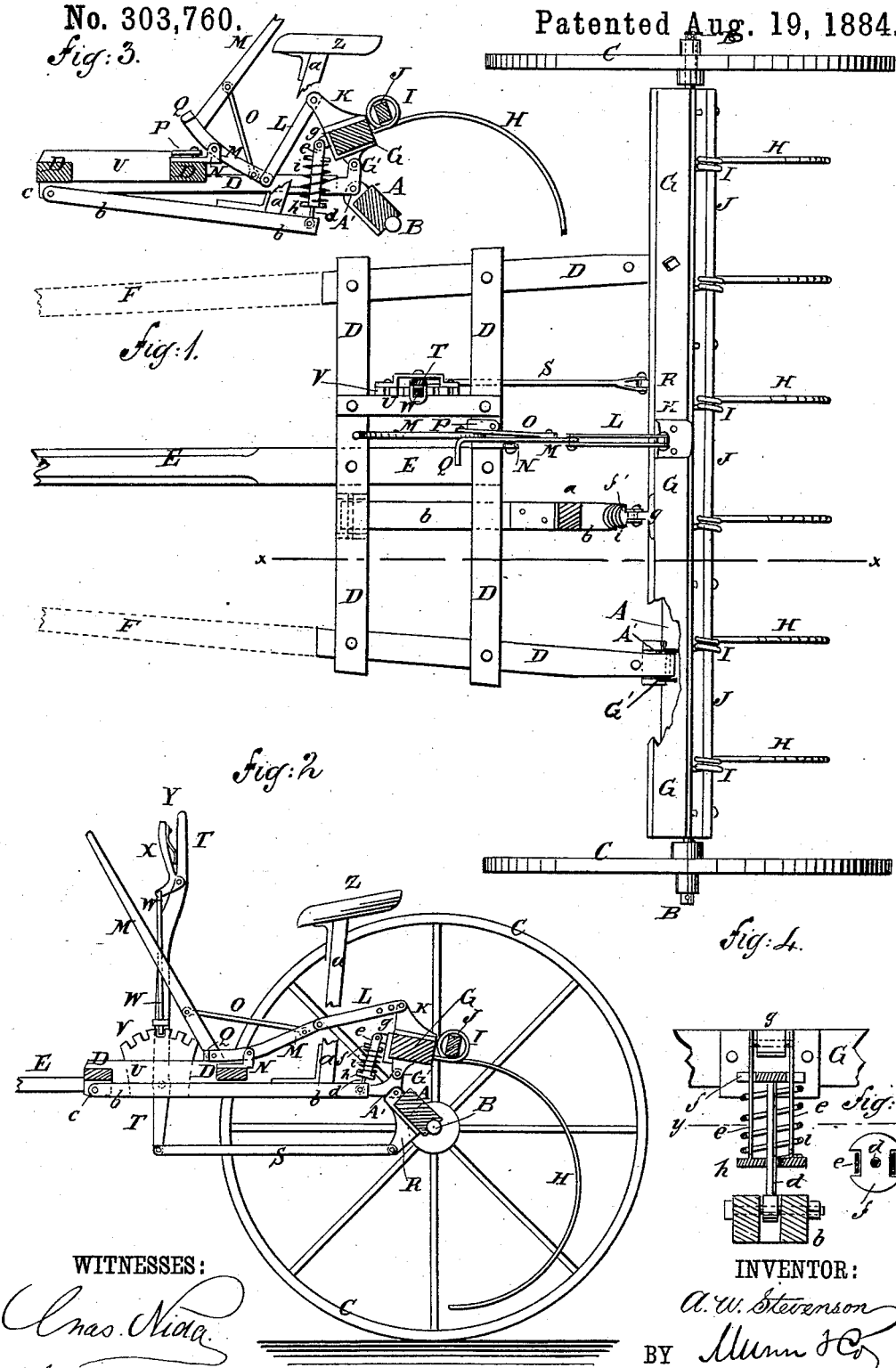

ADOLPHUS W. STEVENSON, OF TROY, OHIO.

HORSE HAY-RAKE.

SPECIFICATION forming part of Letters Patent No. 303,760, dated August 19, 1884.

Application filed July 9, 1883. (No model.)

*To all whom it may concern:*

Be it known that I, ADOLPHUS W. STEVENSON, of Troy, in the county of Miami and State of Ohio, have invented certain new and useful Improvements in Horse Hay-Rakes, of which the following is a full, clear, and exact description.

Reference is to be had to the accompanying drawings, forming part of this specification, in which similar letters of reference indicate corresponding parts in all the figures.

Figure 1 is a plan view of my improvement, partly in section and part being broken away. Fig. 2 is a sectional side elevation of the same taken through the line $x\,x$, Fig. 1, and showing the rake-teeth in working position. Fig. 3 is the same section as Fig. 2, but showing the rake-teeth in position for discharging the collected hay, the adjusting-lever and its connections being omitted. Fig. 4 is a sectional elevation of the seat-bar and its spring-support. Fig. 5 is a sectional plan view of the same taken through the line $y\,y$, Fig. 4.

The object of this invention is to promote efficiency in the operation of horse hay-rakes and convenience in controlling and operating such rakes.

The invention consists in a horse hay-rake constructed with its draft-frame and rake-head hinged to each other, and having its seat-standard attached to a bar or other suitable device hinged at its forward end to the draft-frame, and connected at its rear end with the rake-head by coupling-bars and a spring or other suitable device, so that the driver's weight will assist in tilting the rake, and the rake-head will be relieved of the strain of a downward impulse upon the seat-bar. To the rear end of the draft-frame is hinged the axle, which is provided below its center with axle-arms for the supporting-wheels, so that the movement of the said axle about its bearings in the wheels will raise and lower the rake vertically and without changing the relative position of the rake-teeth. The draft-frame and the hinged axle are connected by a lever, connecting-bar, and bracket, and a spring-lever pawl and catch-plate, so that the said axle can be readily operated to raise and lower the rake. The rake-head is hinged to the draft-frame, so that the rake can be operated independently of the axle to discharge the collected hay, as will be hereinafter fully described, and pointed out in the claims.

A represents the axle, to the end parts of the lower edge of which are attached the stud-axles B for the wheels C.

To the upper edge of the axle A is connected by hinges A' the rear end of the draft-frame D, which may be provided with a tongue, E, as shown in full lines in Fig. 1, or with thills F, as indicated in dotted lines in Fig. 1.

G is the rake-head, which is placed directly above the axle A, and is connected at its lower side with the upper part of the rear end of the draft-frame D, by hinges G'. The hinges A' G' may be made in the form of a double hinge, as shown in Figs. 2 and 3, or as separate hinges, as may be desired.

To the rear side of the rake-head G are attached the upper ends of the rake-teeth H, which have coils I formed in them near their upper ends. Through the coils I is passed a bar, J, which is secured to the rear side of the rake-head G by bolts or other suitable means. The teeth H are made of such a length and are so curved that their lower ends will be in the vertical plane of the axis of the wheels C, or nearly so.

To a lug or bracket, K, attached to the upper side of the rake-head G, is pivoted the rear end of a connecting-bar, L, the forward end of which is hinged to the rear end of the lower arm of the bent lever M. The lower arm of the lever M, at a little distance from the angle of the said lever, is pivoted to a lug, N, attached to the rear cross-bar of the draft-frame D. The upper arm of the lever M projects into such a position that it can be readily reached and operated by the driver from his seat. The bent lever M is strengthened by a brace-rod, O, the ends of which are attached to the said lever upon the opposite sides of its angle. With this construction, when the upper arm of the lever M is drawn to the rearward, the bar L will be drawn downward and forward, turning the rake-head G upon its hinges G', and swinging the rake-teeth H upward to discharge the collected hay. The rear part of the lower arm of the lever M is slightly curved upward, as shown in Figs. 2 and 3, so that when the upper arm of the said lever is swung forward to lower the rake-teeth into working position the rear end of the lower arm of the lever M and the forward end of the connecting-bar L will be raised above a line joining the pivotal point of the rear end of the bar L and the fulcrum-point of the lever M, as shown in Fig. 2, so that the lever, bar, and rake will be locked in position automatically.

To the cross-bar of the draft-frame D, at the side of the lug N, is pivoted a button, P, which can be turned in beneath the lever M when desired to prevent the upper arm of the said lever from being swung so far forward as to lock the rake.

Upon the lever M, at its angle, is formed a short laterally-projecting arm, Q, to serve as a foot-rest, so that the driver can hold the rake-teeth in working position when the lever and bar are not allowed to lock.

To the forward side of the axle A is attached a bracket, R, to which is pivoted the rear end of a connecting-bar, S. The forward end of the bar S is pivoted to the lower end of the lever T, which is pivoted at a little distance from its lower end to a bar, U, or other support attached to the draft-frame D.

To the bar or support U is also attached a catch-plate, V, with the notched upper edge of which engages the pawl W. The pawl W slides in a guide attached to the lever T, and is pivoted at its upper end to a small elbow-lever, X, pivoted to the lever T, and held outward by a spring, Y, attached to the lever T, so as to hold the pawl W in contact with the catch-plate V. With this construction, by moving the upper arm of the lever T to the rear, the axle A will be swung in beneath the rear end of the draft-frame D, and by moving the said arm forward the said axle will be swung from beneath the said draft-frame to the rear, so that the rake-head will be raised and lowered vertically to bring the ends of the rake-teeth closer to or farther from the ground without turning the rake-head on its pivot G'. This adjustment can be made while the rake is at work, and without affecting the proper operation of the said rake.

Z is the driver's seat, which is attached to the upper end of the standard $a$. The lower end of the standard $a$ is attached to the upper side of the rear part of the bar $b$, the forward end of which is hinged to lugs $c$, attached to the lower side of the forward cross-bar of the draft-frame D.

The bar $b$ may be varied in its shape, if desired—as, for instance, it may be made in the form of a letter Y or a T, and hinged at the forward end in two places. It may also be coupled at the hinder end to the rake-head by one or more plain bars, if desired.

To the slotted rear end of the seat-bar $b$ is hinged the lower end of a short rod, $d$, which passes up between two bars, $e$, and to its upper end is attached a disk, $f$, recessed upon its opposite edges to receive and slide upon the said bars $e$. The upper ends of the two bars $e$ are pivoted to a lug, $g$, attached to the upper part of the forward side of the rake-head G, and to the lower ends of said bars is attached a disk, $h$, which is perforated for the passage of the rod $d$. Upon the bars $e$ is placed a spiral spring, $i$, the upper end of which rests against the disk $f$ and its lower end rests against the disk $h$, as shown in Figs. 2, 3, and 4. With this construction, when the rake is unlocked by the rearward movement of the upper arm of the lever M, the weight of the driver will assist in turning the rake-head upon its pivots to tilt the rake-teeth and discharge the collected hay. With this construction, also, should the wheels C strike an obstruction, the downward impulse of the driver's weight, caused by the jar, will be sustained by the elasticity of the spring $i$, instead of being transmitted directly to the rake.

I do not abandon or dedicate to the public any patentable feature set forth herein and not hereinafter claimed, but reserve the right to claim the same, either in a reissue of any patent that may be granted upon this application or in any other application for Letters Patent that I may make.

Having thus described my invention, I claim as new and desire to secure by Letters Patent—

1. In a horse hay-rake, the combination, with the draft-frame D and the rake-head G, hinged thereto, of the seat-bar $b$, hinged at its forward end to the draft-frame, and having its rear end connected by a yielding connection to the rake-head, substantially as and for the purpose set forth.

2. In a horse hay-rake, the combination, with the hinged seat-bar $b$ and the rake-head G, of the rod $d$, bars $e$, and spring $i$, substantially as herein shown and described, whereby the rake-head will be relieved of the strain of a sudden downward impulse upon the seat-bar, as set forth.

3. In a horse hay-rake, the combination, with the draft-frame D, of the axle A, hinged thereto, and having eccentric stud-axles B, and means for turning said axle, substantially as described, whereby the rake-head can be raised and lowered vertically without turning it upon its pivots, as set forth.

4. In a horse hay-rake, the combination, with the draft-frame D and the hinged axle A, of the lever T, the connecting-bar S, the bracket R, and the spring-lever pawl W X Y, and catch-plate V, substantially as herein shown and described, whereby the said axle can be readily operated to raise and lower the rake, as set forth.

ADOLPHUS W. STEVENSON.

Witnesses:
 I. S. FORGY,
 W. F. ROSS.